(12) United States Patent
Foster

(10) Patent No.: US 10,001,370 B2
(45) Date of Patent: Jun. 19, 2018

(54) MEASURING AND MARKING TOOL

(71) Applicant: Britton Foster, Pilot Point, TX (US)

(72) Inventor: Britton Foster, Pilot Point, TX (US)

( * ) Notice: Subject to any disclaimer, the term of this patent is extended or adjusted under 35 U.S.C. 154(b) by 211 days.

(21) Appl. No.: 15/072,581

(22) Filed: Mar. 17, 2016

(65) Prior Publication Data

US 2016/0271789 A1    Sep. 22, 2016

Related U.S. Application Data

(60) Provisional application No. 62/134,052, filed on Mar. 17, 2015.

(51) Int. Cl.
| | | |
|---|---|---|
| *G01B 3/56* | (2006.01) | |
| *B25H 7/04* | (2006.01) | |
| *G01C 9/24* | (2006.01) | |

(52) U.S. Cl.
CPC ............... *G01C 9/24* (2013.01); *B25H 7/04* (2013.01); *G01B 3/56* (2013.01)

(58) Field of Classification Search
CPC .... G01B 3/56; B25H 7/00; B25H 7/04; B43L 7/027; B43L 7/0275; G01C 9/24
USPC .................... 33/415–429, DIG. 21
See application file for complete search history.

(56) References Cited

U.S. PATENT DOCUMENTS

| | | | | |
|---|---|---|---|---|
| 223,727 A | * | 1/1880 | Halley ................ | G01B 3/56 33/419 |
| 780,954 A | * | 1/1905 | McCartney .......... | G01B 3/56 33/419 |
| 894,770 A | | 7/1908 | Wood | |
| 926,615 A | * | 6/1909 | Spofford ............. | G01B 3/56 33/425 |
| 1,004,222 A | * | 9/1911 | Whitlock ............. | G01B 3/56 33/423 |
| 1,007,038 A | * | 10/1911 | Maupin ............... | B25H 7/04 33/419 |
| 1,084,973 A | | 1/1914 | Stanwood et al. | |
| 1,451,572 A | * | 4/1923 | Green ................. | G01B 3/56 33/423 |
| 1,521,980 A | | 1/1925 | Waldo | |
| 2,759,267 A | * | 8/1956 | Wood et al. ......... | G01B 5/004 33/419 |
| 4,513,510 A | * | 4/1985 | Swanson .............. | B43L 7/00 33/419 |
| 4,712,307 A | | 12/1987 | Kish | |
| 5,561,911 A | * | 10/1996 | Martin ............... | G01C 15/008 33/290 |
| 5,727,325 A | | 3/1998 | Mussell | |

(Continued)

*Primary Examiner* — R. A. Smith
(74) *Attorney, Agent, or Firm* — PatentFile, LLC; Bradley C. Fach; Steven R. Kick

(57) ABSTRACT

In some embodiments, a measuring and marking tool may include a triangular base member with a right angle and two complementary opposite angles formed by a first leg, a second leg, and a hypotenuse. A pivotal coupling element may pivotally couple an arm element to the right angle of the base member, allowing the arm element to pivot towards and away from the first and second legs. Preferably, a leveling device may be coupled to the arm element. A locking element may be operably connected to the arm element for arresting the pivotal movement of the arm element relative to the base member. An elongated marking aperture, which may have a plurality of marking indentations, may be disposed on the base member.

9 Claims, 5 Drawing Sheets

(56) References Cited

U.S. PATENT DOCUMENTS

| | | | | |
|---|---|---|---|---|
| 5,749,152 A * | 5/1998 | Goss et al. | ............... | G01C 9/24 |
| | | | | 33/377 |
| 6,230,416 B1 * | 5/2001 | Trigilio | .................. | B43L 7/027 |
| | | | | 33/451 |
| 6,314,652 B1 | 11/2001 | English | | |
| 6,393,710 B1 * | 5/2002 | Hastings | .............. | G01B 3/1071 |
| | | | | 33/484 |
| 6,453,568 B1 * | 9/2002 | Hymer | ................. | G01C 15/008 |
| | | | | 33/276 |
| 6,688,014 B1 | 2/2004 | Allemand | | |
| 6,839,974 B1 * | 1/2005 | Hitchcock | ............... | B25H 7/00 |
| | | | | 33/419 |
| 6,868,616 B2 | 3/2005 | Allemand | | |
| 6,954,990 B2 | 10/2005 | Ellis | | |
| 7,478,485 B1 | 1/2009 | Rogell | | |
| 7,481,143 B2 * | 1/2009 | Hiland, Jr. | ........... | B23D 59/001 |
| | | | | 33/418 |

\* cited by examiner

MEASURING AND MARKING TOOL

CROSS REFERENCE TO RELATED APPLICATIONS

This application claims priority to and the benefit of the filing date of U.S. Provisional Application No. 62/134,052, filed on Mar. 17, 2015, entitled "ADJUSTABLE MULTI-USE MEASURING AND MARKING TOOL", which is hereby incorporated by reference in its entirety.

FIELD OF THE INVENTION

This patent specification relates to the field of tools used by craftsman such as carpenters. More specifically, this patent specification relates to multi-use hand tools capable of measuring and marking distances, angles, and levels.

BACKGROUND

There are many types and forms of tools used to assist a craftsman with the job of measuring and marking of angles while working on a project. Perhaps the most well known tool for roofing carpenters is the speed square invented in 1925 and sold by the Swanson Tool Company. The speed square comprises a right-angle (90 degree) triangle generally made from metal or plastic and includes markings on the hypotenuse corresponding to degrees as well as markings corresponding to unit rise over run values traditionally used to measure the angles on a roof. A craftsman, such as a roofing carpenter, may use this tool to mark the proper base cut of a rafter corresponding to the rise and run of the roof being constructed.

Despite its wide spread use, there are many disadvantages to the speed square and similar tools known in the art. First, the design of the speed square requires the use of two hands with one hand holding one corner of the device and pivoting the unit with the other hand to measure or mark angles onto a work piece. Second, the device does not provide a means to lock a desired angle in place and therefore it requires a great deal of wasted time to mark multiple identical angles onto a work piece. Third, the traditional speed square is limited in its functionality by not providing a means to measure levels on different planes (e.g. measure horizontal and vertical levels). Fourth, the traditional speed square is also not able to measure angles between two points at a distance (i.e. from the top to the bottom of a stairway). Finally, it is not able to act as a compass to mark circular lines of specific sizes onto a work piece or drawing.

There is therefore a great need in the field for a new multi-use hand tool which is compact and can be easily carried by a craftsman on a job site and that is able to measure and mark angles, lock the device at desired angle to easily mark multiple lines at that desired angle, measure levels in multiple planes, measure angles between two points at a distance, and draw circular lines of specific and various sizes.

BRIEF SUMMARY OF THE INVENTION

A measuring and marking tool is provided which is configured to measure and mark angles, reproduce desired angles to easily mark multiple lines at that desired angle, measure levels in multiple planes, measure angles between two points at a distance, and draw circular lines of specific and various sizes. In some embodiments, a measuring and marking tool may include a triangular base member with a right angle and two complementary opposite angles formed by a first leg, a second leg, and a hypotenuse. A pivotal coupling element may pivotally couple an arm element to the right angle of the base member, allowing the arm element to pivot towards and away from the first and second legs. A locking element may be operably connected to the arm element for arresting the pivotal movement of the arm element relative to the base member. An elongated marking aperture, which may have a plurality of marking indentations, may be disposed on the base member.

In further embodiments, the measuring and marking tool may comprise one or more leveling devices such as tubular spirit levels and bull's eye spirit levels. A leveling device may be coupled to the arm element, base member 11, or to any other element of the measuring and marking tool.

In further embodiments, the measuring and marking tool may comprise one or more beam generators which may be configured to project a beam of light. A beam generator 33 may comprise a laser beam generator and/or an illumination providing light emitting element, such as a light emitting diode (LED) or simply a flashlight, configured to project a beam of light onto an area a distance from the beam generator.

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Figure 1:
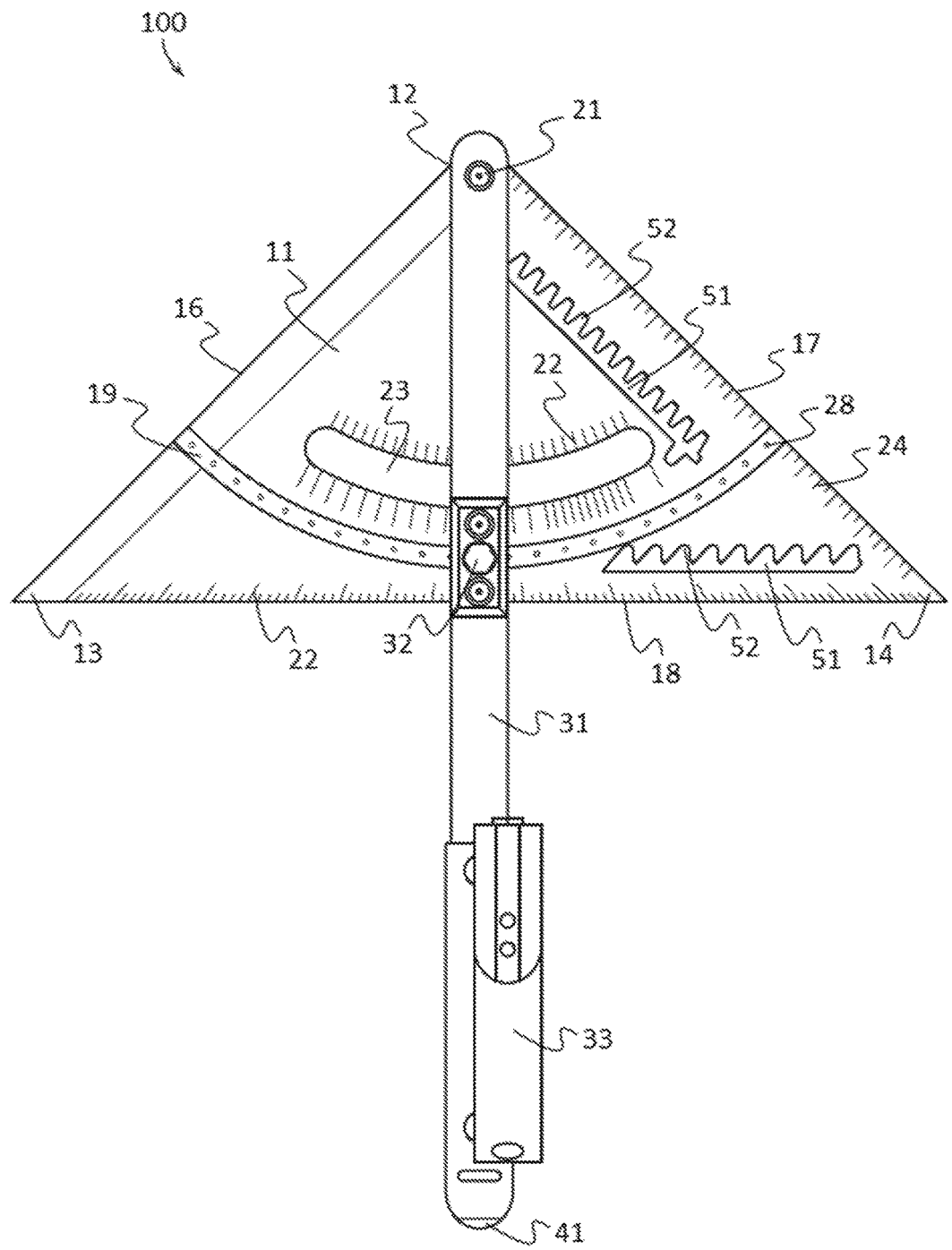
FIG. 1 depicts a top plan view of an example of a measuring and marking tool according to various embodiments described herein.

For purposes of description herein, the terms "upper", "lower", "left", "right", "rear", "front", "side", "vertical", "horizontal", and derivatives thereof shall relate to the invention as oriented in FIG. 1. However, one will understand that the invention may assume various alternative orientations and step sequences, except where expressly specified to the contrary. Therefore, the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

New multi-use hand tools capable of measuring and marking distances, angles, levels, and performing other functions are discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

Figure 2:
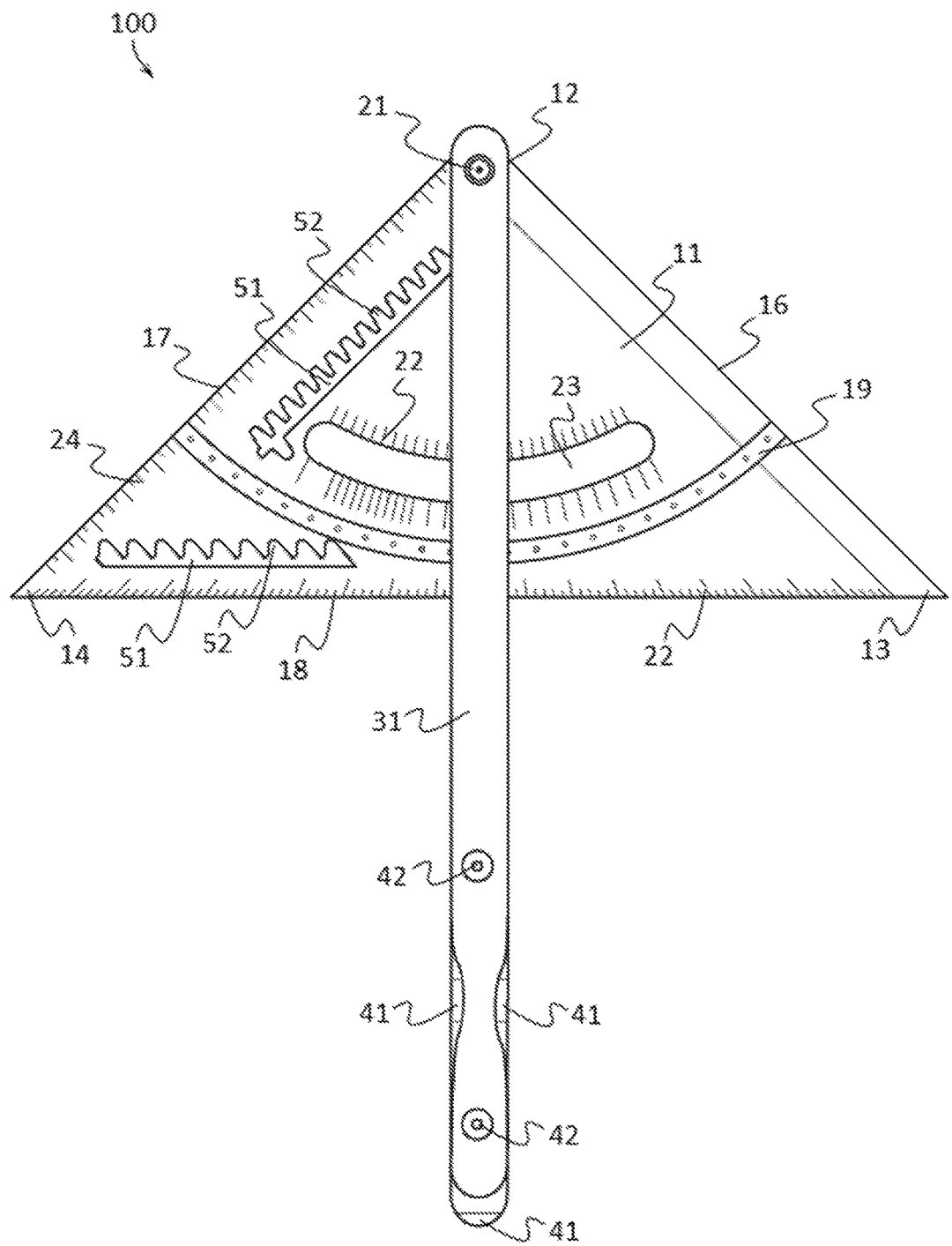
FIG. 2 illustrates a bottom plan view of an example of a measuring and marking tool according to various embodiments described herein.

The present invention will now be described by example and through referencing the appended figures representing preferred and alternative embodiments. FIGS. 1 and 2 illustrate an example of a measuring and marking tool ("the tool") 100 according to various embodiments. In some embodiments, the tool 100 may comprise a triangular base member 11 with a right angle 12 and two complementary opposite angles 13, 14, formed by a first leg 16, a second leg 17, and a hypotenuse 18. A pivotal coupling element 21 may pivotally couple an arm element 31 to the right angle 12 of the base member 11, allowing the arm element 31 to pivot towards and away from the first 16 and second 17 legs. Preferably, a leveling device 41 and/or beam generator 33 a may be coupled to the arm element 31. A locking element 32 may be operably connected to the arm element 31 for arresting the pivotal movement of the arm element 31 relative to the base member 11. An elongated marking aperture 51, which may comprise a plurality of marking indentations 52, may be disposed on the base member 11.

As shown in FIGS. 1-6, the base member 11 may comprise a triangular shape with a right angle 12 and two complementary opposite angles 13, 14. The angles 12, 13, 14, may be formed by a first leg 16, second leg 17, and a hypotenuse 18. In some embodiments, the first 16 and second 17 legs may be of equal lengths and the opposite angles 13, 14, may be equal in measure. In alternative embodiments, the first 16 and second 17 legs may not be of equal lengths and the opposite angles 13, 14, may not be equal in measure. In preferred embodiments, the base member 11 may be made from light and durable materials such as aluminum, plastic, and steel.

Figure 6:
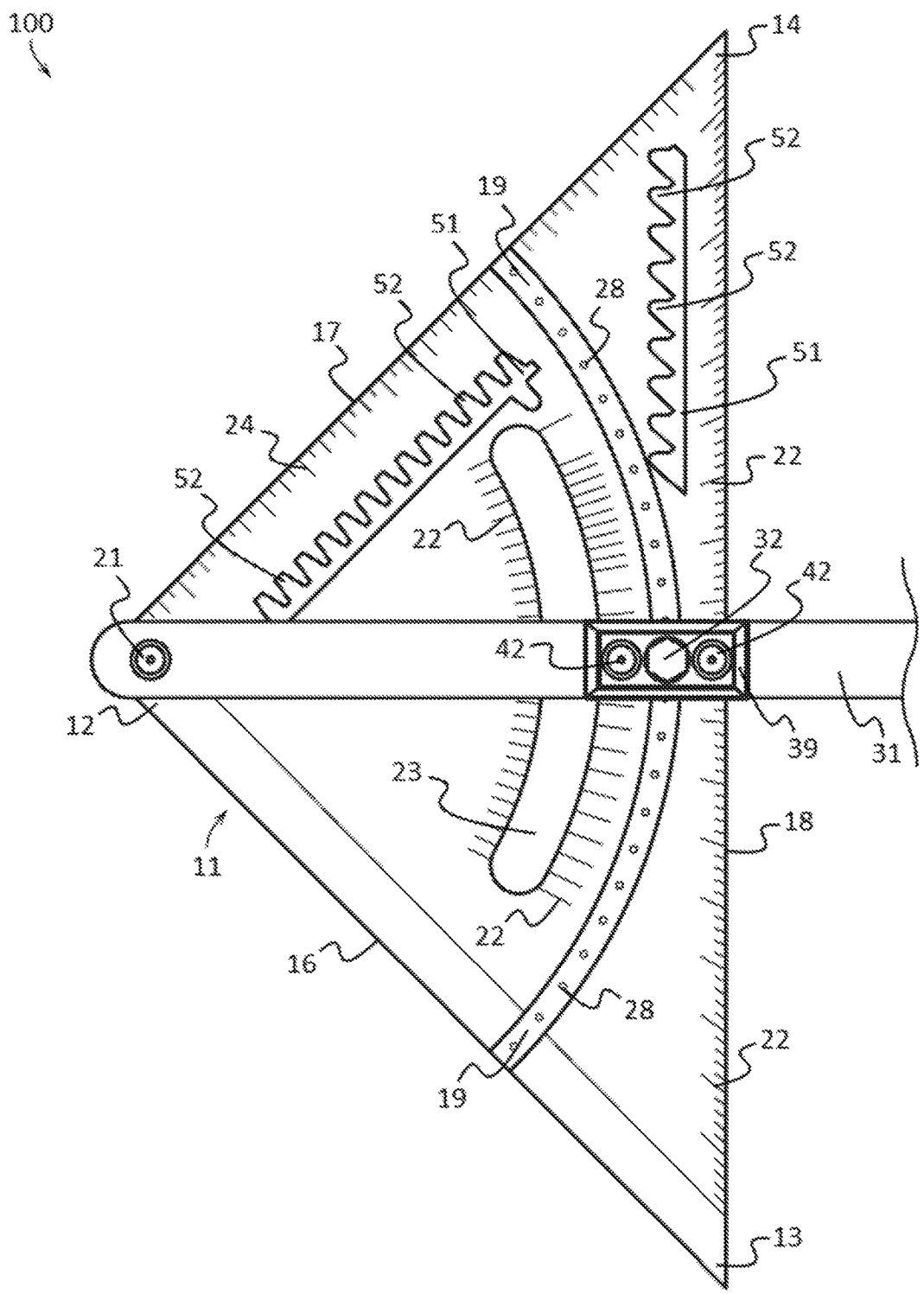
FIG. 6 shows a partial top plan view of an example of a measuring and marking tool according to various embodiments described herein.

As perhaps best shown in FIG. 6, the base member 11 may comprise one or more angular reference markings 22 which may correspond to degrees or increments of degrees of an angle, typically from 0 to 90 degrees, which may be used to measure or mark the angle of an object or a line onto a work piece. In some embodiments, the angular reference markings 22 may be disposed along the hypotenuse 18 of the base member 11. In further embodiments, the base member 11 may comprise a hip-valley aperture 23 and one or more angular reference markings 22 may configured as angle or rise/run angular reference markings 22 that may be disposed on or proximate to the hip-valley aperture 23 which may correspond to commonly used rise over run values and/or to commonly used hip and valley measurements. In alternative embodiments, one or more angular reference markings 22 may be disposed along the first leg 16 and/or second leg 17 of the base member 11. By noting which angular reference marking 22 the arm element 31 is positioned next to, the angular position of the arm element 31 relative to the base member 11, such as to the first 16 and second 17 leg, may be determined.

The base member 11 may also comprise one or more linear reference markings 24 which may correspond to distance measurements and increments of distance measurement, such as inches, inch increments, meters, meter increments, centimeters, and/or centimeter increments. In some embodiments, the linear reference markings 24 may be disposed along the first leg 16 and/or second leg 17 of the base member 11. In further embodiments, one or more linear reference markings 24 may be disposed on or along the arm element 31. In still further embodiments, one or more linear reference markings 24 may be disposed on, along, or proximate to an elongated marking aperture 51. In alternative embodiments, one or more linear reference markings 24 may be disposed on or along the hypotenuse 18 of the base member 11.

The tool 100 may also comprise one or more elongated marking apertures 51 which may have one or more marking indentations 52. In some embodiments, an elongated marking aperture 51 may comprise one, two, three, four, five, six, seven, eight, nine, ten, or more, such as a plurality, of marking indentations 52. A marking indentation 52 may comprise a notch, groove, indentation, or the like, which may be of the general dimension to allow a carpenters pencil or other writing implement to be inserted into the marking indentation 52 within the elongated marking aperture 51 to allow the writing implement to contact surfaces on the opposite side of the base member 11. The marking indentation 52 preferably may correspond to a desired unit distance dimension which may be shown by linear reference markings 24 proximate or positioned along the marking indentations 52 of the elongated marking aperture 51. In further embodiments, an elongated marking aperture 51 may be positioned proximate and parallel to the hypotenuse 18 of the base member 11. In still further embodiments, an elongated marking aperture 51 may be positioned proximate and parallel to the first leg 16 and/or second leg 17 of the base member 11.

In some embodiments, the tool 100 may comprise a hip-valley aperture 23. One or more angular reference markings 22, such as rise over run reference markings, may be positioned proximate to or along the hip-valley aperture 23. In some embodiments, angular reference markings 22 proximate to the hip-valley aperture 23 may be configured to indicate the rise in inches over a 12 inch run for common rafters from 1 inch to 30 inches. In further embodiments, angular reference markings 22 proximate to the hip-valley aperture 23 may be configured to indicate the rise in inches over a 12 inch run for Hip or Valley rafters from 1 inch to 30 inch. In other embodiments, angular reference markings 22 proximate to the hip-valley aperture 23 may be configured to indicate any other type of rise over run dimensions.

Figure 3:
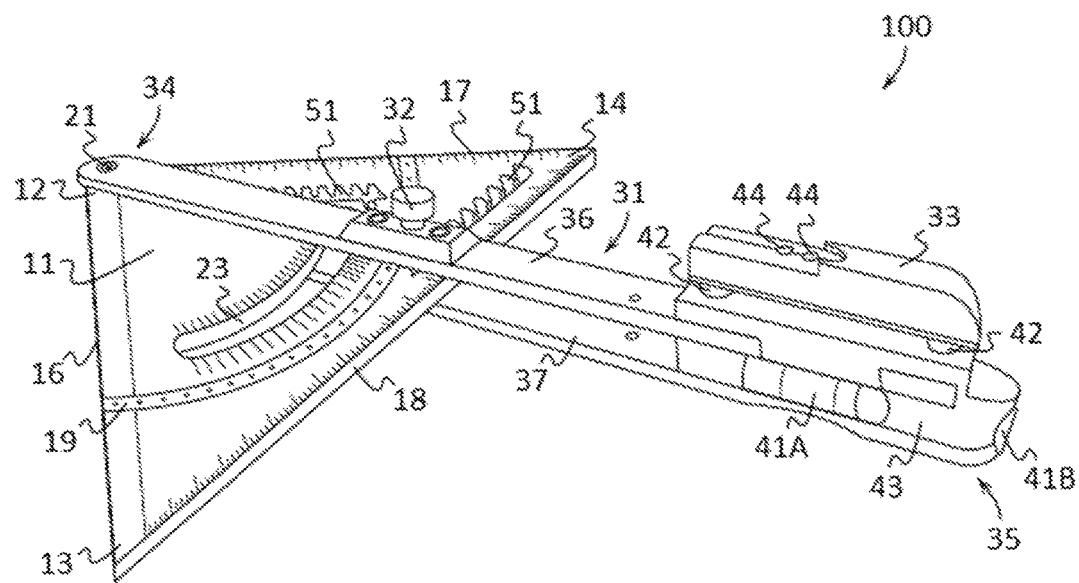
FIG. 3 shows a top perspective view of an example of a measuring and marking tool according to various embodiments described herein.
Figure 4:
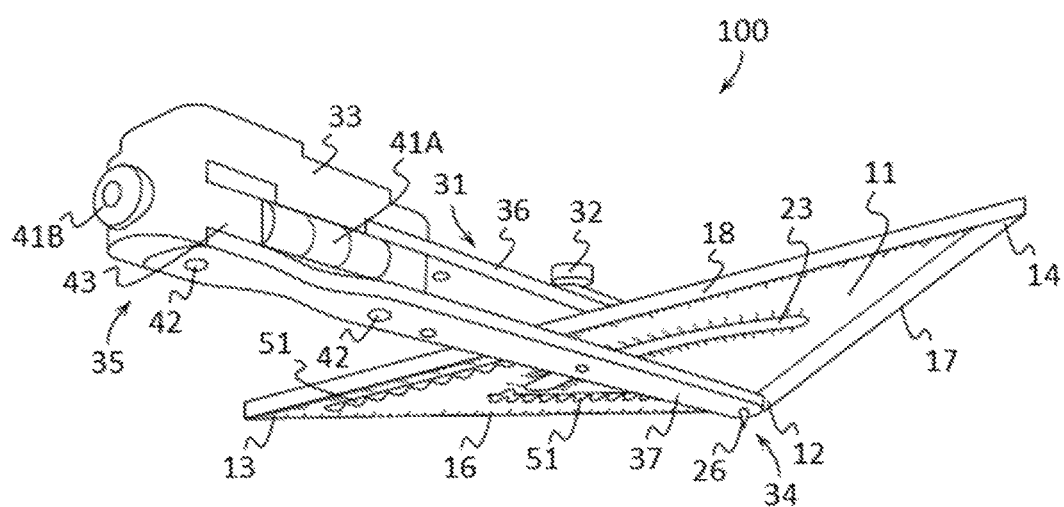
FIG. 4 depicts a bottom perspective view of an example of a measuring and marking tool according to various embodiments described herein.
Figure 5:
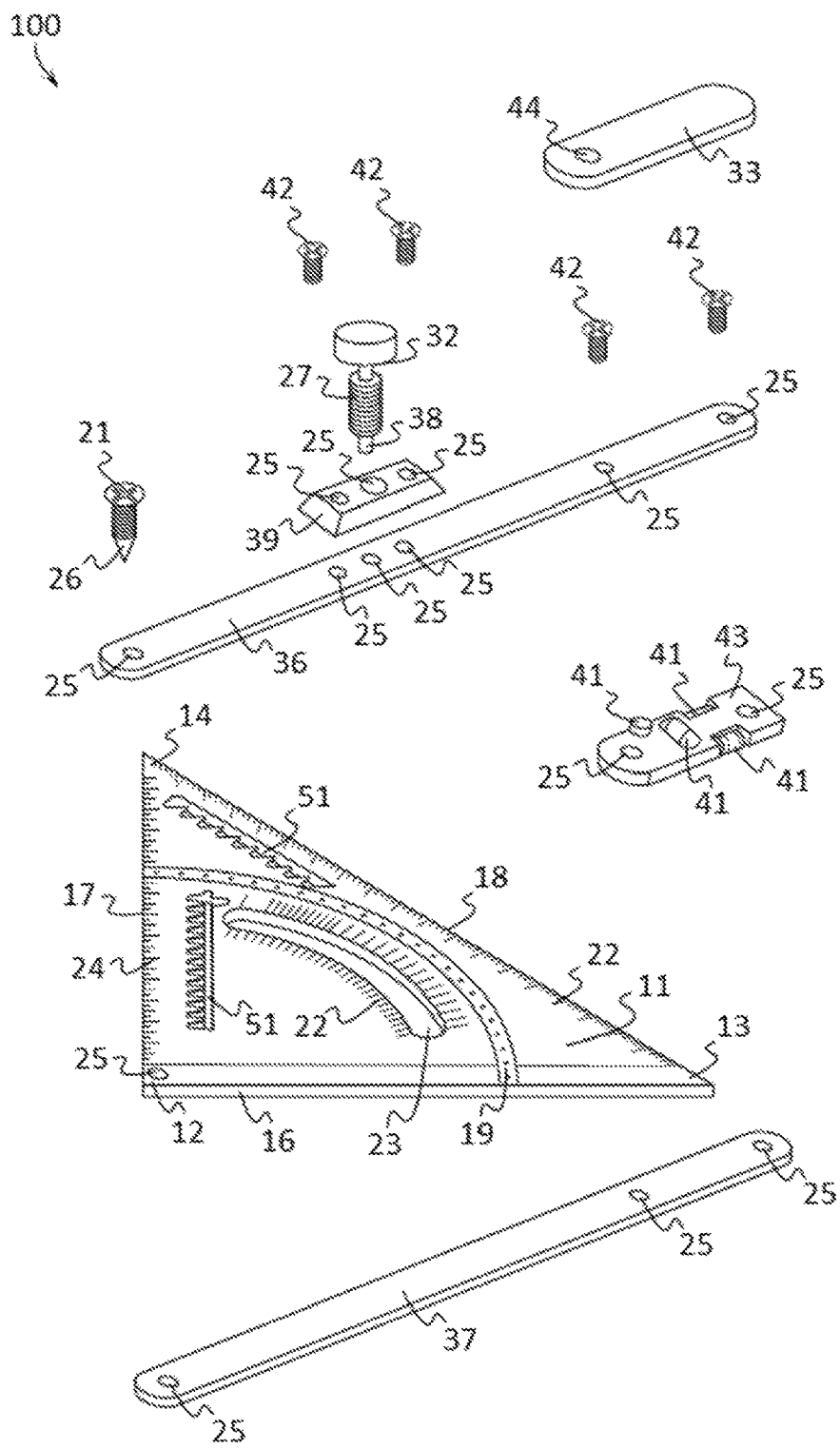
FIG. 5 illustrates a top perspective exploded view of an example of a measuring and marking tool according to various embodiments described herein.

The device 100 may comprise an arm element 31 which may be pivotally coupled to the right angle 12 of the base member 11 with a pivotal coupling element 21, allowing the arm element 31 to pivot towards and away from the first 16 and second 17 legs. The arm element 31 may comprise a first end 34, which may be pivotally coupled to the right angle 12, and a second end 35 which may extend past the hypotenuse 18. As shown in FIGS. 3-5 and in some embodiments, the arm element 31 may optionally comprise an upper arm unit 36 and a lower arm unit 37 which may be coupled together and/or coupled to the pivotal coupling element 21. The base member 11 may be positioned between the upper arm unit 36 and lower arm unit 37 and then coupled together with a pivotal coupling element 21 configured to allow the arm element 31 to be pivoted relative to the base member 11 such as pivot towards and away from the first 16 and second 17 legs. In alternative embodiments, the arm element 31 may be unitary in structure, for example having only an upper arm unit 36 or a lower arm unit 37, and coupled above or below the base member 11 to the right angle 12. Optionally, an arm member 31, including an upper arm unit 36 and a lower arm unit 37 may comprise one or more fastener apertures 25 which may be configured to receive or be coupled to locking elements 32, pivotal coupling elements 21, other fasteners 42, and the like.

The pivotal coupling element 21 may form the axis around which the arm element 31 may be moved or pivoted while coupled to the base member 11. In some embodiments, a pivotal coupling element 21 may comprise a threaded fastener such as a screw, bolt, or other threaded fastener, which may engage to the arm element 31 and base member 11 through a fastener aperture 25. In other embodiments, a pivotal coupling element 21 may comprise a rivet, pivot pin, ball bearing assembly, or any other type of pivotable or movable coupling fastener or method. Optionally, the arm element 31 and/or the pivotal coupling element 21 may be removably coupled to the base member 11 to allow the tool 100 to be reconfigured with different interchangeable arm elements 31, pivotal coupling elements 21, and/or base members 11.

Referring now to FIGS. 4 and 5, in some embodiments, the tool 100 may comprise a pointed member 26 which may be coupled to the right angle 12 of the base member 11. The pointed member 26 may be conical or pointed in shape so that when pressed into contact with an object, pointed member 26 may pierce or indent portions of the object. In this manner, by pressing the pointed member 26 into contact with an object, the pointed member 26 may maintain the position of the tool 100 on the object while allowing the tool to be pivoted around the axis formed by the pointed member 26 and the pierced or indented portions of the object. In preferred embodiments, the pointed member 26 may be integrally formed with the pivotal coupling element 21 so that when the pivotal coupling element 21, arm element 31, and base member 11 are coupled together, all or portions of the pointed member 26 may extend below the tool 100 to contact an object the tool 100 is placed upon. In alternative embodiments, the pointed member 26 may be coupled or removably coupled to the pivotal coupling element 21, arm element 31, or base member 11.

The locking element 31 may be operably connected to the arm element 31 and configured to arrest the pivotal movement of the arm element 31 relative to the base member 11. In preferred embodiments, the locking element 31 may comprise threading 27 which may be used to threadably engage the locking element 31 to the arm element 31. By rotating the locking element 31 in a first direction, the locking element 31 may be threadably moved through a fastener aperture 25 on the arm element 31 until it contacts a portion of the base member 11 thereby frictionally arresting the arm element 31 to the base member 11. By rotating the locking element 31 in a second direction, the locking element 31 may be threadably moved through a fastener aperture 25 on the arm element 31 until it ceases contact with a portion of the base member 11 thereby allowing the arm element 31 to be pivotally moved relative to the base member 11. In alternative embodiments, the locking element 31 may comprise a push-to-lock type connection method, a turn-to-lock type connection method, slide-to-lock type connection method, or any other method of temporarily arresting the pivotal movement of the arm element 31 relative to the base member 11.

In further embodiments, the base member 11 may comprise a track 19 with one or more angle depressions 28 and the locking element 31 may comprise a locking tip 38 which may be received by an angle depression 28. Preferably, the track 19 and angle depressions 28 may be arranged in an arc with the angle depressions 28 spaced to correspond to popular or common angles used in construction and fabrication arts. The track 19 may comprise an arc shaped depression or indentation which may contact portions of the locking element 31. The angle depressions 28 may comprise indentations or depressions within the track 19 which may be complementarily shaped to the locking tip 38 to allow all or a portion of the locking tip 38 to be received in an angle depression 28. By engaging the locking tip 38 with an angle depression 28, a user may quickly and easily position the arm element 31 relative to the base element 11 in a popular or common angle used in construction and fabrication arts.

In preferred embodiments, the locking tip 38 may be retractably coupled to the locking element 32 and configured to spring lock into angle depressions 28 positioned as the most commonly used angles. For example, a locking element 32 may comprise a locking tip 38 that may be spring loaded with a portion of the locking tip 38 configured to retract and extend from the locking element 32 under pressure which may be provided by a spring. The locking tip 38 may then spring into one or more angle depressions 28 on the track 19 thereby temporarily securing the arm element 31 in various angles relative to the base member 11. By applying force to the arm element 31, the locking tip 38 may retract out from one angle depression 28 and into another angle depression 28 as the arm element 31 is moved relative to the base member 11. Furthermore, by rotating a locking element 32 which is threadably engaged to the arm element 31, the amount of force required to move the locking tip 38 from one angle depression 28 and into another angle depression 28 may be removed, altered, or locked.

In some embodiments, the tool 100 may comprise an arm brace 39 which may be coupled to the arm element 31 to structurally reinforce the engagement of the locking element 32 to the arm element 31. The arm brace 39 may comprise a fastener aperture 25 configured to receive the locking element 32 and optionally to threadably engage threading 27 of the locking element 32. In further embodiments, the arm element 31 may comprise fastener apertures 25 which are complementarily spaced to fastener apertures 25 on the arm brace 39 and one or more fasteners 42 may be used to couple the arm brace 39 to the arm element 31, such as to an upper arm unit 36.

In some embodiments, a locking element 32 may lock the arm element 31 at any angle relative to the base member 11 such as by engaging threading 27 on the locking element 32 with threading in a fastener aperture 25 on the arm element 31. In further embodiments, the locking element 32 may be configured to pass through a fastener aperture 25 in the arm element 31, such as in an upper arm unit 36, and/or in an arm brace 39 and may be turned to exert pressure between the base member 11 and the arm element 31 thereby locking the arm element 31 in a fixed position relative to the base member 11. In this manner, the tool 100 may be configured to act as a bevel to measure and copy angles by locking the arm element 31 into a desired position relative to the base member 11 corresponding to an angle being measured or copied.

Turning now to FIGS. 1, 3-5, in some embodiments, the tool 100 may comprise a beam generator 33 which may be coupled to the arm element 31, such as to the first end 34. In further embodiments, a beam generator 33 may comprise a laser beam generator, such as a laser pointer, configured to project a beam of laser light onto a point a distance from the beam generator 33. In still further embodiments, a beam generator 33 may comprise an illumination providing light emitting element, such as a light emitting diode (LED) or simply a flashlight, configured to project a beam of light onto an area a distance from the beam generator 33.

In some embodiments, the beam generator 33 may be substantially permanently mounted or coupled to the arm element 31. In other embodiments, and as shown in FIG. 5, the beam generator 33 may be removably coupled or temporarily attached to the arm element 31 such as with threaded fasteners 42, magnets, other fasteners, snaps, Velcro, frictional engagement, push-to-lock connection method, turn-to-lock connection method, or any other suitable removable coupling. The beam generator 33 is generally configured to be small in nature as to fit comfortably onto the arm element 31 and it may contain one or more on/off switches or buttons 44 to control laser beam emission and/or other types of light beam emissions from the beam generator 33.

In embodiments in which the tool 100 comprises a beam generator 33, the tool 100 is capable of shooting a beam of light (e.g. a laser beam) to illuminate a point in the distance out and way from the arm element 31 and along the same plane (e.g. parallel to the arm element 31) and an illuminating beam of light out and way from the arm element 31 and along the same plane (e.g. parallel to the arm element 31). By way of example, a user may place the tool 100 against a surface at one point and either note where the arm element 31 is in relation to the angle or rise/run angular reference markings 22 or simply place the tool 100 on its side so that the arm element 31 is at a zero degree orientation angle. The user may then turn on the beam generator 33 and adjust the arm element 31 and shoot a beam to a desired point in the distance. The user can then view the arm element 31 corresponding angle according the degree or rise/run angular reference markings 22 to determine the angle between the location of the tool 100 and a point in the distance. In this regard the tool 100 may act as a device to measure the angle between two points at a distance such as from the bottom floor to the top floor which is useful when building stairs and also to illuminate areas.

As shown in FIGS. 1-5, the tool 100 may comprise one or more leveling devices 41 which may be coupled to the arm element 31, base member 11, and/or to a beam generator 33. A leveling device 41 may comprise any type level indicating device including spirit levels such as tubular spirit levels 41A and bull's eye spirit levels 41B. The leveling devices 41 may be configured to allow the tool 100 to be capable of acting as a level allowing a user to measure the orientation of an object or surface against which the tool 100 may be placed in both a horizontal and vertical plane.

In some embodiments, one or more leveling devices 41, such as tubular spirit levels 41A and/or bull's eye spirit levels 41B, may be coupled to the arm element 31 such as by being coupled within a leveling array 43 and the leveling array 43 may be coupled to the arm element 31. A leveling array 43 may be formed to secure or couple one or more tubular spirit levels 41A and/or bull's eye spirit levels 41B in a desired orientation relative to each other. Optionally, a leveling device 41 and/or leveling array 43 may comprise one or more fastener apertures 25 and a fastener 42 may be inserted through a fastener aperture 25 of the arm element 31 and through a fastener aperture 25 of the leveling device 41 and/or leveling array 43 to coupled the leveling device 41 and/or leveling array 43 to the arm element 31. In further embodiments, a leveling array 43 may be coupled to the arm element 31 between an upper arm unit 36 and a lower arm unit 37. In preferred embodiments, a bull's eye spirit level 41B may be coupled to the second end 35 of the arm element 31 and two tubular spirit levels 41A may be coupled to the arm element 31 along a horizontal plane on opposite sides of the arm element 31. In still further embodiments, a leveling device 41, such as a bull's eye spirit level 41B, may be located within or at the end of the arm element 31 along a vertical plane.

While some materials have been provided, in other embodiments, the elements that comprise the tool 100 such as the base member 11, arm element 31, pivotal coupling element 21, locking element 32, optional leveling array 43, optional fasteners 42, optional locking tip 38, optional arm brace 39, optional beam generators 33, and/or optional leveling devices 41 may be made from durable materials such as aluminum, steel, other metals and metal alloys, wood, hard rubbers, hard plastics, fiber reinforced plastics, carbon fiber, fiber glass, resins, polymers or any other suitable materials including combinations of materials. Additionally, one or more elements may be made from or comprise durable and slightly flexible materials such as soft plastics, silicone, soft rubbers, or any other suitable materials including combinations of materials. In some embodiments, one or more of the elements that comprise the tool 100 may be coupled or connected together with heat bonding, chemical bonding, adhesives, clasp type fasteners, clip type fasteners, rivet type fasteners, threaded type fasteners, other types of fasteners, or any other suitable joining method. In other embodiments, one or more of the elements that comprise the tool 100 may be coupled or removably connected by being press fit or snap fit together, by one or more fasteners such as hook and loop type or Velcro® fasteners, magnetic type fasteners, threaded type fasteners, sealable tongue and groove fasteners, snap fasteners, clip type fasteners, clasp type fasteners, ratchet type fasteners, a push-to-lock type connection method, a turn-to-lock type connection method, slide-to-lock type connection method or any other suitable temporary connection method as one reasonably skilled in the art could envision to serve the same function. In further embodiments, one or more of the elements that comprise the tool 100 may be coupled by being one of connected to and integrally formed with another element of the tool 100.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A measuring and marking tool, the tool comprising:
   a right-triangular base member with two complementary opposite angles formed by a first leg, a second leg, and a hypotenuse;
   a pivotal coupling element pivotally coupling an arm element to the right angle of the base member;
   a locking element operably connected to the arm element for arresting the pivotal movement of the arm element relative to the base member; and
   a track with angle depressions for receiving a tip of the locking element.

2. The tool of claim 1, further comprising angular reference markings disposed along the hypotenuse.

3. The tool of claim 1, further comprising linear reference markings disposed along at least one of the legs.

4. The tool of claim 1, further comprising a beam generator coupled to the arm element.

5. The tool of claim 1, further comprising a pointed member coupled to the right angle of the base member.

6. The tool of claim 1, further comprising a leveling device.

7. The tool of claim 1, further comprising an elongated marking aperture which is positioned on the base member proximate and parallel to the hypotenuse.

8. The tool of claims 1, further comprising an elongated marking aperture which is positioned on the base member proximate and parallel along at least one of the legs.

9. The tool of claim 1, wherein the locking element is threadedly coupled to the arm element.

* * * * *